United States Patent
Yamashita et al.

(10) Patent No.: US 8,908,110 B2
(45) Date of Patent: Dec. 9, 2014

(54) INFORMATION PROCESSING DEVICE AND COMPUTER PROGRAM

(75) Inventors: Kosei Yamashita, Kanagawa (JP); Atsushi Hashizume, Tokyo (JP); Hideyuki Matsunaga, Kanagawa (JP)

(73) Assignee: Sony Corporation, Tokyo (JP)

( * ) Notice: Subject to any disclaimer, the term of this patent is extended or adjusted under 35 U.S.C. 154(b) by 23 days.

(21) Appl. No.: 13/562,545

(22) Filed: Jul. 31, 2012

(65) Prior Publication Data

US 2013/0063668 A1 Mar. 14, 2013

(30) Foreign Application Priority Data

Sep. 13, 2011 (JP) .................................. 2011-199227
Sep. 13, 2011 (JP) .................................. 2011-199228

(51) Int. Cl.
*H04N 5/60* (2006.01)
*H04N 21/439* (2011.01)
*H04N 21/4402* (2011.01)
*H04N 21/485* (2011.01)
*H04N 21/431* (2011.01)
*H04N 21/422* (2011.01)

(52) U.S. Cl.
CPC ......... *H04N 21/4312* (2013.01); *H04N 21/439* (2013.01); *H04N 21/440263* (2013.01); *H04N 21/4858* (2013.01); *H04N 21/4221* (2013.01)
USPC ............................. 348/738; 348/282; 709/234

(58) Field of Classification Search
CPC ........................................................ H04N 5/60
USPC ........... 386/282; 709/234; 348/565, 588, 14.1
See application file for complete search history.

(56) References Cited

U.S. PATENT DOCUMENTS

2010/0325307 A1* 12/2010 Roos ............................. 709/234
2012/0014673 A1* 1/2012 O'Dwyer ...................... 386/282

FOREIGN PATENT DOCUMENTS

| JP | 2008-135891 | 6/2008 |
|----|-------------|--------|
| JP | 2008-135892 | 6/2008 |
| JP | 2008-209641 | 9/2008 |
| JP | 2008-226400 | 9/2008 |
| JP | 2010-136117 | 6/2010 |

* cited by examiner

*Primary Examiner* — Jefferey Harold
*Assistant Examiner* — Sihar Karwan
(74) *Attorney, Agent, or Firm* — Oblon, Spivak, McClelland, Maier & Neustadt, L.L.P.

(57) ABSTRACT

Provided is an information processing device including an audio adjustment unit configured to adjust focus values each indicating a degree of highlighting of audio data of each content displayed in a plurality of display areas.

8 Claims, 9 Drawing Sheets

INFORMATION PROCESSING DEVICE AND COMPUTER PROGRAM

BACKGROUND

The present disclosure relates to an information processing device, an information processing method, and a computer program that adjust audio outputs of a plurality of contents.

An audio signal processing technique that enables a viewer to distinguish a plurality of contents at the same time is proposed (e.g., Japanese Laid-Open Patent Publications Nos. 2008-135892, 2008-135891, 2008-209641, 2008-226400, and 2010-136117). In this technique, allocation of divided bands generated by dividing a frequency band, and extraction, time division, periodic modulation, processing and orientation allocation of frequency components are carried out on of a plurality of audio signals, so that separation information on the audio signals and information associated with a degree of highlighting are added. Allocation of the divided bands is to allocate frequency bands that are not acoustically masked from each other. By mixing and outputting such audio signals, the viewer may simultaneously listen to the audios that are acoustically separated. By changing the amount to which the divided bands are allocated, the degree of highlighting of the audio may be changed. The degree parameter of highlighting of the audio is referred to as a focus value. In brief, the audio signal processing technique is a technique that may reflect the focus value that is the degree of highlighting of each audio while generating a plurality of audio signals that may be acoustically separated and recognized.

SUMMARY

However, television screens of a liquid crystal type or a plasma type have become wider and thinner in recent years. According to the increase in the screen size, it is possible to set a plurality of display areas in one television screen and to display different contents (television program or video) on the respective display areas. Accordingly, a user may view videos of the plurality of contents at the same time.

Although different videos of the contents may be displayed in the plurality of display areas, an audio of only one content is output. When audios of the plurality of contents are to be output, it is difficult for the viewer to distinguish the audios. The present inventors have thus considered applying the audio signal processing technique mentioned above to separate and output audios of the respective contents in a recognizable state and to output each audio to the viewer in an optimal state.

According to an embodiment of the present disclosure, there is provided an information processing device including an audio adjustment unit configured to adjust focus values each indicating a degree of highlighting of audio data of each content displayed in a plurality of display areas.

In addition, according to another embodiment of the present disclosure, there is provided a computer program causing a computer to function as an information processing device including a display processing unit causing an audio adjustment unit to be displayed on a display unit, the audio adjustment unit being configured to adjust focus values each indicating a degree of highlighting of audio data of each content displayed in a plurality of display areas.

According to the present disclosure, it is possible to adjust a focus value of each audio data by virtue of an audio adjustment unit.

According to the embodiments of the present disclosure described above, it is possible for a viewer watching the contents to freely adjust each audio.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, the description is made in the following order.
<1. Audio output system outputting audios of a plurality of contents at the same time>
[1-1. System outline]
[1-2. Remote controller configuration]
[1-3. Conjunction of screen size and focus value]
<2. Configuration of audio output system>
[2-1. Concept description]
[2-2. Hardware configuration example]
(2-2-1. Television)
(2-2-2. Remote controller)
[2-3. Configuration example of television and remote controller]
<3. Example of applying audio output system>
<1. Audio Output System Outputting Audios of a Plurality of Contents at the Same Time>
[1-1. System Outline]

First, an audio output system outputting audios of a plurality of contents according to an embodiment of the present disclosure will be described with reference to FIG. 1. In addition, FIG. 1 is a diagram illustrating a state in which the audio output system is applied to a television in accordance with the embodiment of the present disclosure.

In the present embodiment, the case in which the audio output system according to the present embodiment is applied to a two-screen television having two display areas on the screen and two programs are watched at the same time will be described as an example. Needless to say, the present disclosure is not limited thereto, and it is possible to apply the present disclosure to a device outputting two or more screens or audios. In addition, a target to which the system is applied is not limited to the television, and it is also possible to apply the present disclosure to a case in which a plurality of contents are reproduced or carried out on a display unit of information equipment such as a personal computer, a PDA, and a car navigation system.

Figure 1:
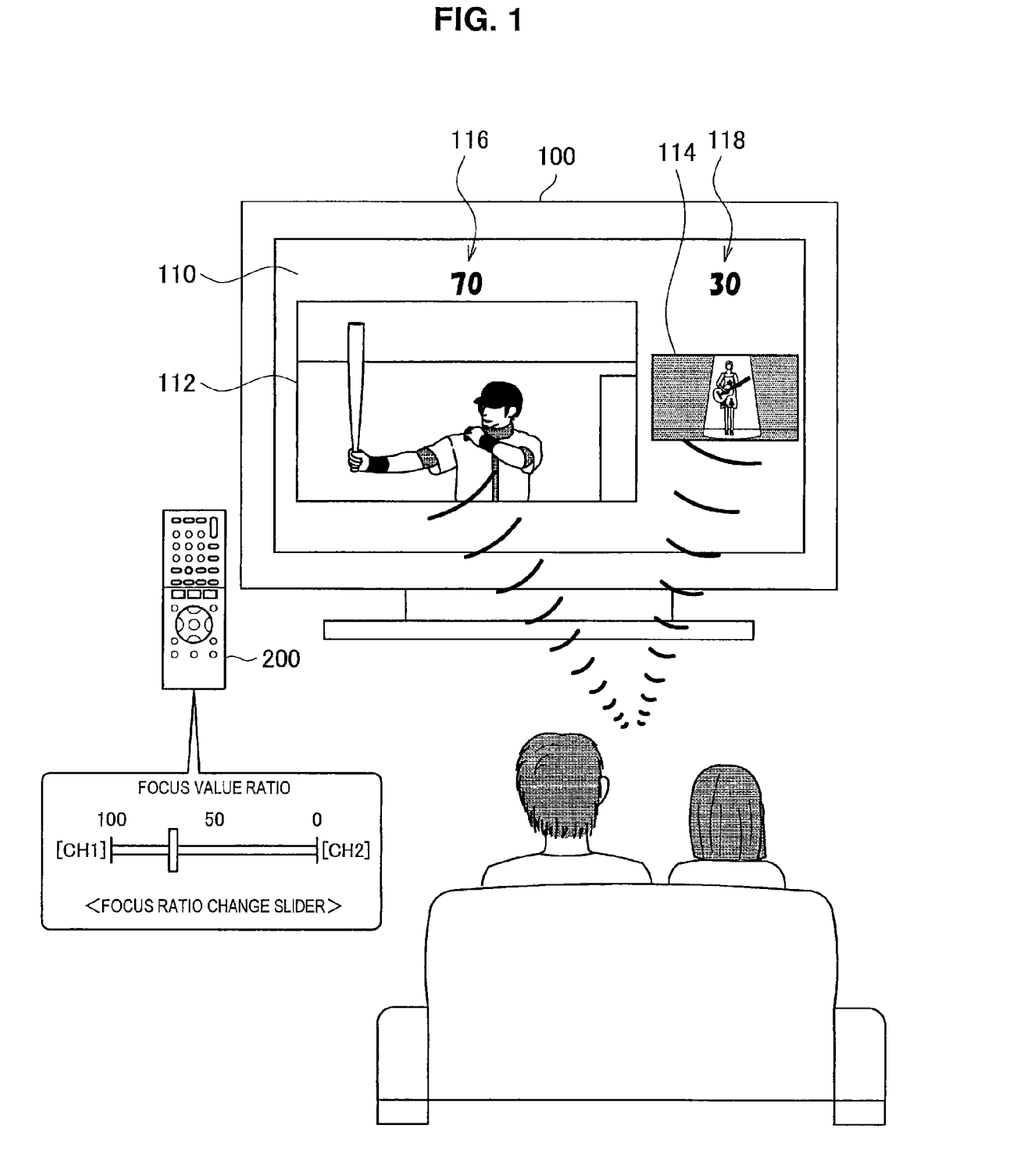
FIG. 1 is a diagram illustrating a state in which an audio output system is applied to a television in accordance with an embodiment of the present disclosure.

As shown in FIG. 1, viewers are watching two programs on a television 100. A first display area 112 and a second display area 114 are on a display unit 110 of the television 100, and programs are displayed in the display areas 112 and 114. In addition, audios of the respective programs displayed in the display areas 112 and 114 are output from speakers (not shown). In the audio output system according to the present embodiment, for example, the frequency division multiplexing processes disclosed in Japanese Laid-Open Patent Publications Nos. 2008-135892, 2008-135891, 2008-209641, 2008-226400, and 2010-136117 are employed to enable audios such as musical compositions to be simultaneously provided and selectively distinguished. In the frequency division multiplexing process, the plurality of audios may be distinguished even when the audios are mixed. In addition, the plurality of audios may be processed not by the volume but by the parameter known as focus.

Here, the focus is a parameter indicating the degree of highlighting of the audio. A value of the focus (referred to as a focus value) is, for example, 0 to 100. It is thus possible to change the focus value of the audio in 101 steps. The audio is clearly output when the focus value is increased, and is indistinctly output when the focus value is decreased.

The audio of each program may be changed by a remote controller 200 (hereinafter, simply referred to as a remote) for operating the television 100. In the remote 200 of the present embodiment, for example, a display mode switching button for switching the display area of the display unit 110 between a one-screen mode and a two-screen mode, a focus value ratio change slider for changing the ratio of the focus value with respect to the audio of each program in the two screen modes, and so forth are disposed. The user may change the ratio of the focus value of each program using the focus value ratio change slider, so that the audio of the interesting program may be more clearly output and the audio of the other program with a recognizable sound quality may also be output naturally without disruption. That is, it is possible to change the audio to the sound quality according to degrees of interest of the viewers. It is thus possible to satisfy the interest of each viewer and for the viewers to share the same time and place.

[1-2. Remote Configuration]

Figure 2:
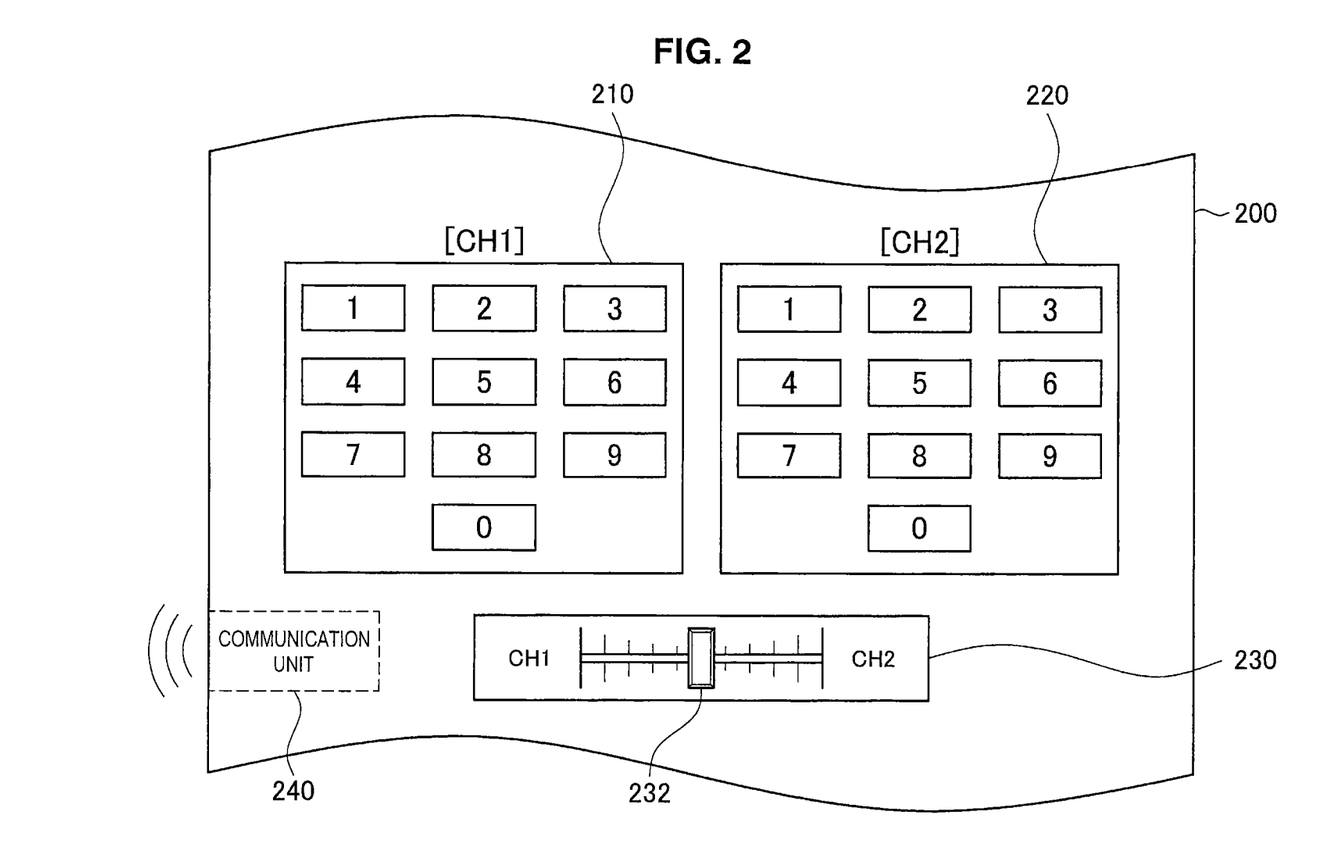
FIG. 2 is a diagram illustrating an example configuration of a remote controller in accordance with the embodiment of the present disclosure.

FIG. 2 illustrates an example configuration of the remote 200 in accordance with the present embodiment. Referring to FIG. 2, select buttons 210 and 220 and a focus ratio change slider 230 of an operation input unit of the remote 200 are illustrated.

In a similar way to the typical remote of the television, a power button or select buttons (reference numerals 210 and 220), volume adjustment buttons, display mode switching buttons, and so forth are disposed in the remote 200. Such an operation input unit may be an input unit that is physically pressed or slid for the operation, or may be a software input unit configured using a touch panel in the display unit of the remote 200. When the touch panel is used for the input unit, a virtual button or a slider may be displayed on the display unit. The user may carry out the operation input by touching the screen to operate the software input unit.

The remote 200 of the present embodiment has two select buttons 210 and 220 so as to enable the programs displayed in the respective display areas 112 and 114 to be readily selected when a two-screen mode is selected by the display mode switching button. The select buttons 210 and 220 correspond to channels and include ten channel buttons corresponding to the channels. The program to be displayed in the first display area 112 may be selected when the channel button of the select button 210 is operated, and the program to be displayed in the second display area 114 may be selected when the channel button of the select button 220 is operated. That is, the select buttons are disposed by the number of the display areas that may be set in the display unit 110. Accordingly, it is not necessary to select the display area as a target to be operated, and the desired program of the display area may be directly set.

In addition, the focus ratio change slider 230 is disposed on the remote 200 as an audio adjustment unit for adjusting the focus ratio with respect to the audio of the program displayed in each of the display areas 112 and 114 in the two-screen mode. A channel selected in the first display area 112 is CH1, and a channel selected in the second display area 114 is CH2. As shown in FIG. 2, a slide unit 232 that may be moved along a straight line is disposed on the focus ratio change slider 230. The focus ratio of CH1 and CH2 is set in response to the position of the slide unit 232 on the straight line.

When the slide unit 232 is moved to an end of the CH1 side on the straight line, the focus ratio of CH1 and CH2 is 100:0, and the audio of CH1 is adjusted to be clearly heard. On the other hand, when the slide unit 232 is moved to an end of the CH2 side on the straight line, the focus ratio of CH1 and CH2 is 0:100, and the audio of CH2 is adjusted to be clearly heard. When the slide unit 232 is moved to a center of the straight line, the focus ratio of CH1 and CH2 is 50:50, and audios of CH1 and CH2 are adjusted to be heard at the same time. By moving the slide unit 232, it is possible to continuously change the focus ratio.

Figure 3:
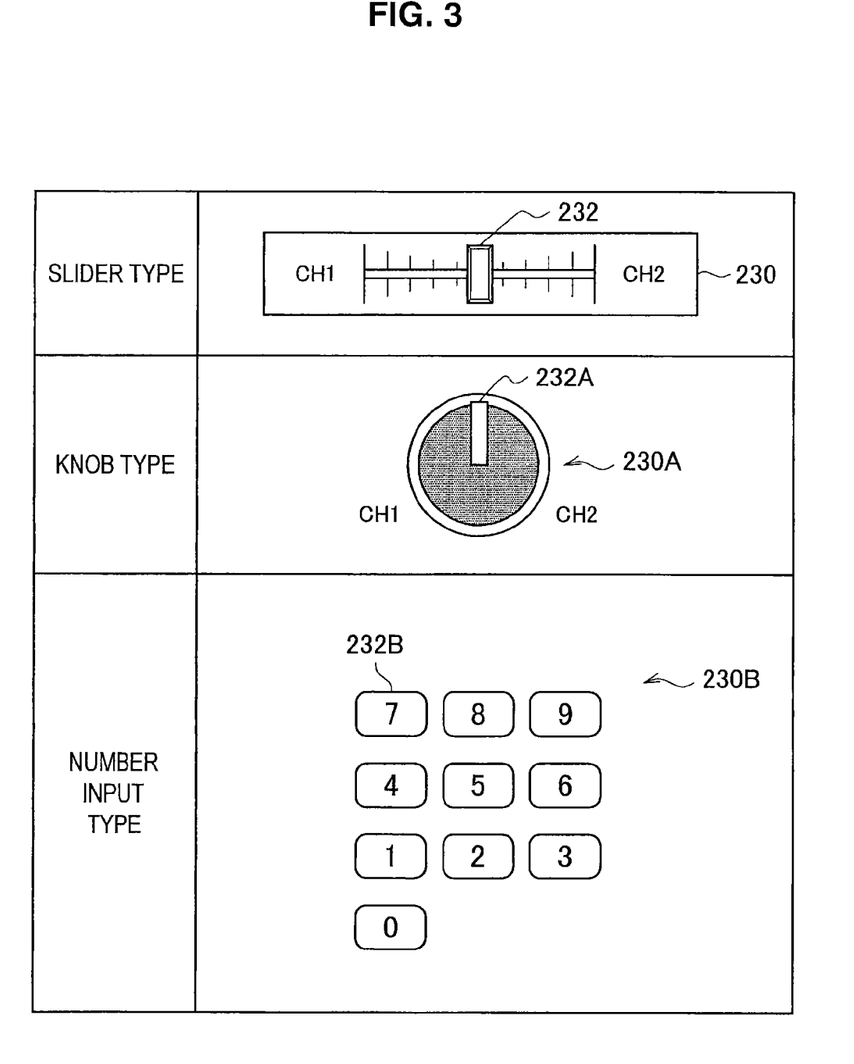
FIG. 3 is a diagram illustrating a modified example of an operation input unit that changes a focus value ratio in accordance with the embodiment of the present disclosure.

In addition, although the audio adjustment unit for changing the focus value ratio is a slider type in FIG. 2, the present disclosure is not limited thereto. For example, the present disclosure may be applied to a knob type focus value ratio change unit 230A as shown in FIG. 3. In the knob type focus value ratio change unit 230A, it is possible to change the focus value ratio of CH1 and CH2 based on the rotational angle from a reference position of the knob unit 232A. For example, the focus value ratio of CH1 to CH2 may be increased when the knob unit 232A is rotated counterclockwise, and the focus value ratio of CH2 to CH1 may be increased when the knob unit 232A is rotated clockwise. In addition, although one knob type focus value ratio change unit 230A adjusts the focus value ratio of the two channels in FIG. 3, the present disclosure is not limited thereto. For example, the knob type focus value ratio change unit 230A may be disposed for each corresponding channel.

Alternatively, the present disclosure may be applied to a number input type focus value ratio change unit 230B. The viewer uses the numerical keypad 232B to input a focus value of one channel (e.g., CH1) in the number input type focus value ratio change unit 230B. In this way, the focus value of another channel (e.g., CH2) is automatically determined.

As described above, a shape of the operation input unit that changes the focus value ratio may be appropriately determined in accordance with the configuration or the type of usage of the remote 200.

The remote 200 carries out wireless communication with the television 100 via the communication unit 240. The communication method of the communication unit 240 may be, for example, an infrared communication method, or may be a communication method using a wireless Local Area Network (LAN). By using the communication unit 240, it is possible to notify the television 100 of information input from the remote 200.

[1-3. Conjunction of Screen Size and Focus Value]

In the present embodiment, it is possible to use the television 100 in the two-screen mode and to change the focus value of the audio and the display area size in conjunction with each other. In general, it may be considered that the viewer wants to primarily watch the program of which the focus value of the audio is set to be high between two programs. The sizes of the two display areas 112 and 114 are then changed in response to the focus value ratio set by the focus value ratio change slider 230, and the viewer may more clearly watch the program of interest.

For example, setting of the focus value ratio change slider 230 and handling the corresponding display areas 112 and 114 may be set as follows. When the position of the slide unit 232 is moved to an end of CH1 displayed in the display area 112, the screen size of the display area 112 is maximized and the screen size of the display area 114 is minimized. On the other hand, when the position of the slide unit 232 is moved to an end of CH2 displayed in the display area 114, the screen size of the display area 114 is maximized and the screen size of the display area 112 is minimized. When the slide unit 232 is moved to a center on the straight line, the screen sizes of the display areas 112 and 114 are equal to each other.

That is, when the screen sizes of the display areas 112 and 114 are represented as 0 to 100, the following relation is made.

(A1) screen size of display area of CH1=position of slide unit
(B1) screen size of display area of CH2=100−(position of slide unit)
(C1) screen size of display area of CH1+screen size of display area of CH2=100

In addition, the following relation is made with respect to the focus value described above.

(A2) focus value of audio of CH1=position of slide unit
(B2) focus value of audio of CH2=100−(position of slide unit)
(C2) focus value of audio of CH1+focus value of audio of CH2=100

Figure 4:
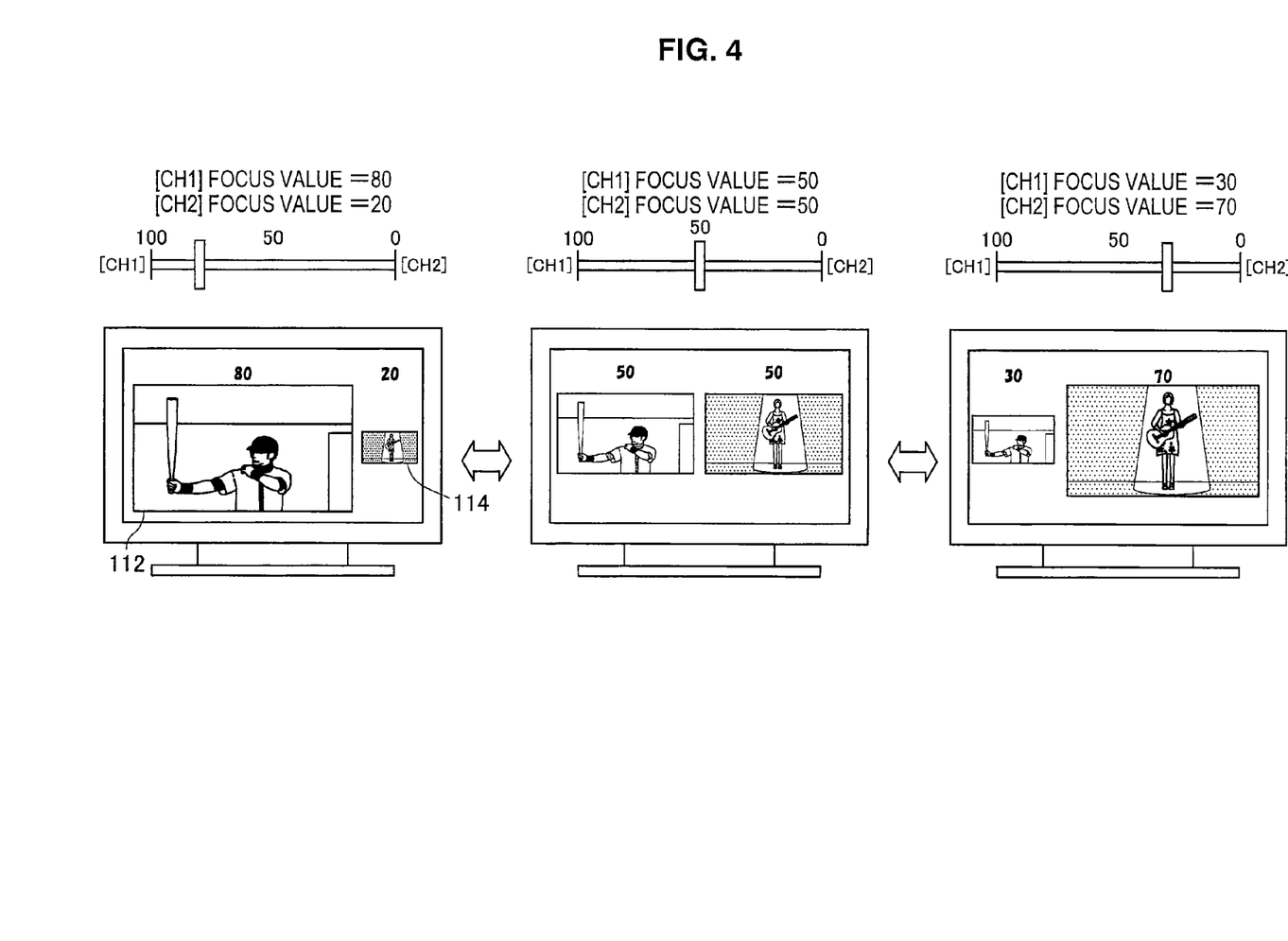
FIG. 4 is a diagram illustrating changes in screen size of a display area and focus value of audio in response to positions of a slide unit of a focus value ratio change slider.

As described above, by moving the slide unit 232, it is possible to continuously change the screen sizes of the display areas 112 and 114 and the focus values of the audios. A specific example thereof is illustrated in FIG. 4. A case in which the position of the slide unit 232 of the focus value ratio change slider 230 is 80 is illustrated in the left of FIG. 4. In this case, the focus value of the audio of CH1 is 80, and the screen size of the display area 112 is also 80. On the other hand, the focus value of the audio of CH2 is 20, and the screen size of the display area 114 is also 20. It is thus possible to clearly watch the program of CH1.

A case in which the position of the slide unit 232 of the focus value ratio change slider 230 is 50 is illustrated in the center of FIG. 4. In this case, the focus values of the audios of CH1 and CH2 are 50, and the screen sizes of the display areas 112 and 114 are also 50. It is thus possible to watch the programs of CH1 and CH2 with the same focus values of the audios and the same screen sizes.

A case in which the position of the slide unit 232 of the focus value ratio change slider 230 is 30 is illustrated in the right of FIG. 4. In this case, the focus value of the audio of CH1 is 30, and the screen size of the display area 112 is also 30. On the other hand, the focus value of the audio of CH2 is 70, and the screen size of the display area 114 is also 70. It is thus possible to clearly watch the program of CH2.

In the display unit 110 of the television 100, the focus values set by the focus value ratio change slider 230 may be displayed in the display areas 112 and 114 (reference numerals 116 and 118 of FIG. 1). By displaying such focus values, it is possible for the viewer to confirm the current focus values.

Figure 5:
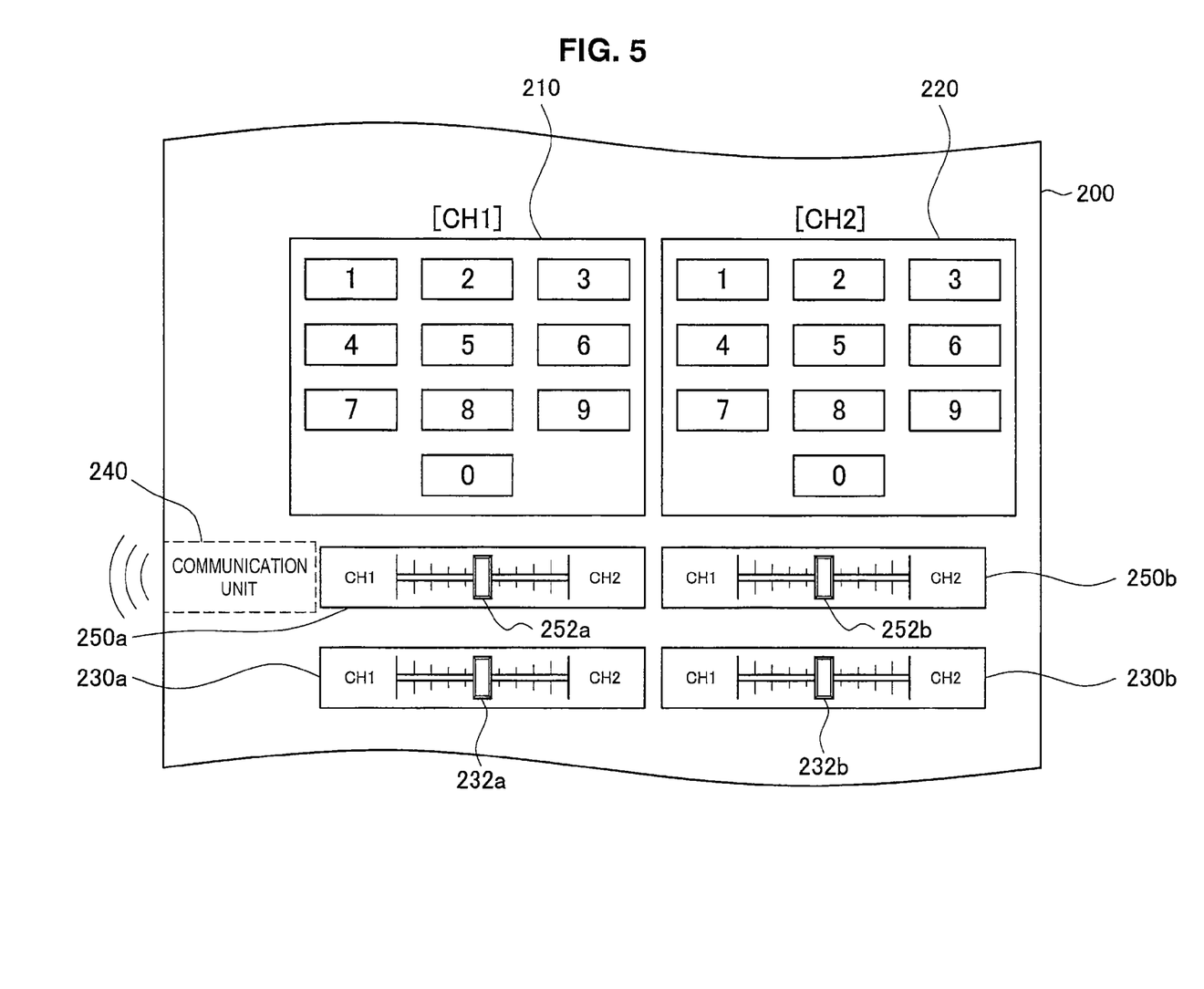
FIG. 5 is a diagram illustrating another example configuration of a remote controller in accordance with the embodiment of the present disclosure.

In addition, although the screen sizes of the display areas 112 and 114 and the focus values of the audios are set to be equal to each other, the present disclosure is not limited thereto. For example, the change rate of the screen size and the focus value may be separately set in accordance with the viewer's preference. For example, as shown in FIG. 5, a slider 230a setting the focus value of the audio of the program displayed in the display area 112 and a slider 230b setting the focus value of the audio of the program displayed in the display area 114 may be separately disposed. In addition, sliders 250a and 250b acting as display area adjustment units setting the respective screen sizes of the display areas 112 and 114 may also be disposed. It is thus possible to independently set the screen sizes of the display areas 112 and 114 and the focus values of the respective programs by moving the positions of the slide units 232a, 232b, 252a, and 252b of the respective sliders.

In addition, although the screen sizes of CH1 and CH2 and the focus values of the audios may be independently set in the example illustrated in FIG. 5, the two slide units 252a and 252b of the screen sizes may be set to operate as one unit in conjunction with each other. In addition, the two slide units 232a and 232b of the focus values of the audios may be set to operate as one unit in conjunction with each other.

In addition, although the one-screen mode and the two-screen mode are switched by the display mode switching button in the present embodiment, the present disclosure is not limited thereto. For example, automatic setting may be carried out such that the one-screen mode corresponds to a case in which the slide unit 232 of the focus value ratio change slider 230 is located at position 100 and the two-screen mode corresponds to a case in which the slide unit 232 of the focus value ratio change slider 230 is located at a position other than 100 without using the display mode switching button.

<2. Configuration of Audio Output System>

[2-1. Concept Description]

Figure 6:
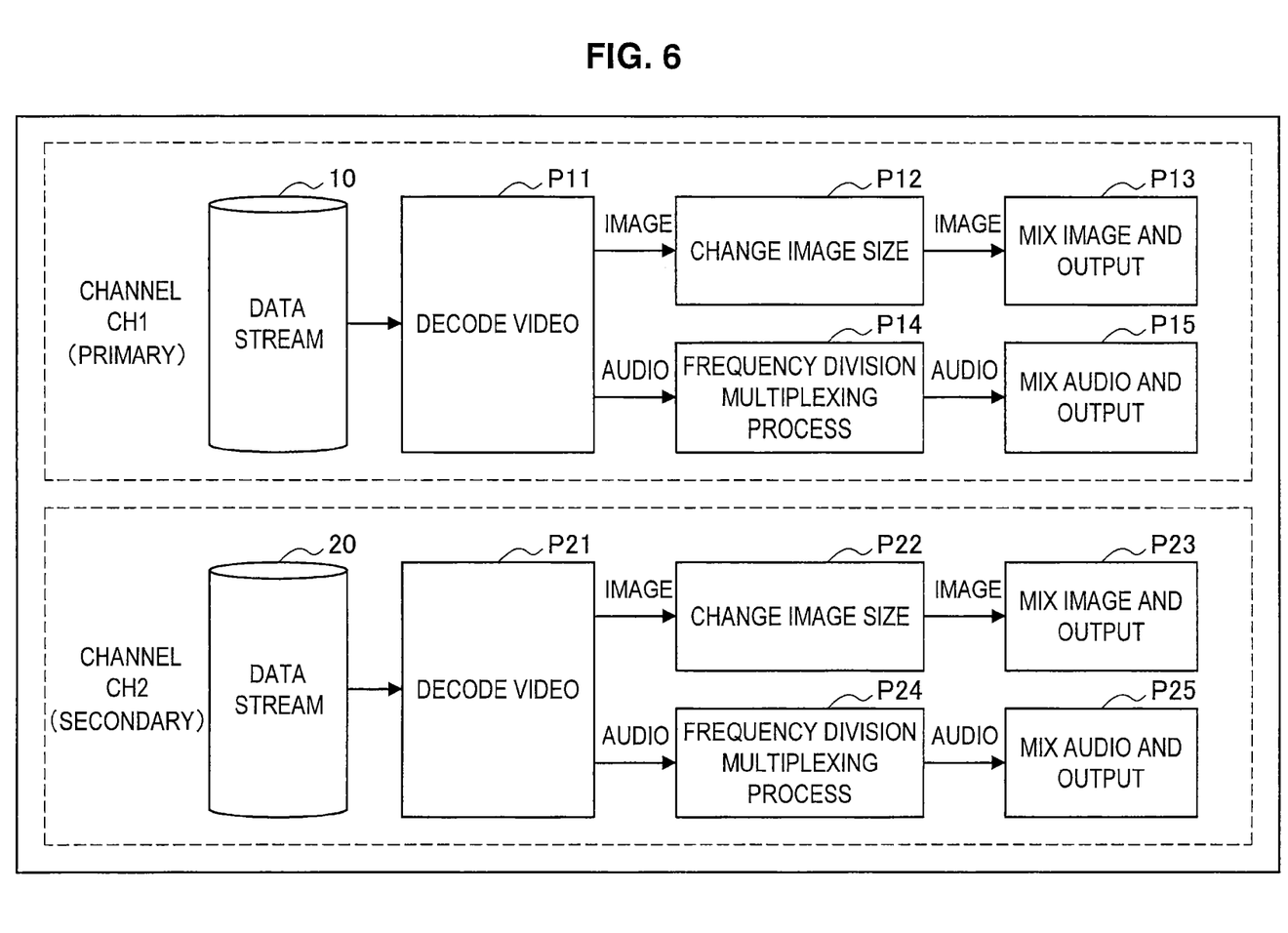
FIG. 6 is a block diagram conceptually illustrating a process of an audio output system in accordance with the embodiment of the present disclosure.

FIG. 6 is a block diagram conceptually illustrating the process of the audio output system in accordance with the present embodiment. In the audio output system of the present embodiment, the (primary) program of CH1 is displayed in the display area 112, and the (secondary) program of CH2 is displayed in the display area 114.

For example, the program of CH1 is obtained by receiving and demodulating broadcast waves such as digital terrestrial broadcasting, and decoding the compressed data streams 10 by virtue of a video decoder (P11). The decoded data streams 10 are separated into image data and audio data. The image data is resized to a designated image size (P12) and then output to an image output device via an image mixer (P13). On the other hand, the decoded audio data is processed to have a designated focus value by the frequency division multiplexing process (P14) and then output to an audio output device via an audio mixer (P15).

In a similar way to the process of the program of CH1, the process of the program of CH2 includes first decoding the data streams 20 and then separating the data streams into image data and audio data (P21). The image data is resized to a designated image size (P22) and then output to an image output device via an image mixer (P23). On the other hand, the decoded audio data is processed to have a designated focus value in the frequency division multiplexing process (P24) and then output to an audio output device via an audio mixer (P25).

When the image and the audio of the program of CH1 and the image and the audio of the program of CH2 are output, the images are displayed in the respective display areas 112 and 114, and the audios are mixed and finally output.

[2-2. Hardware Configuration Example]

(2-2-1. Television)

Figure 7:
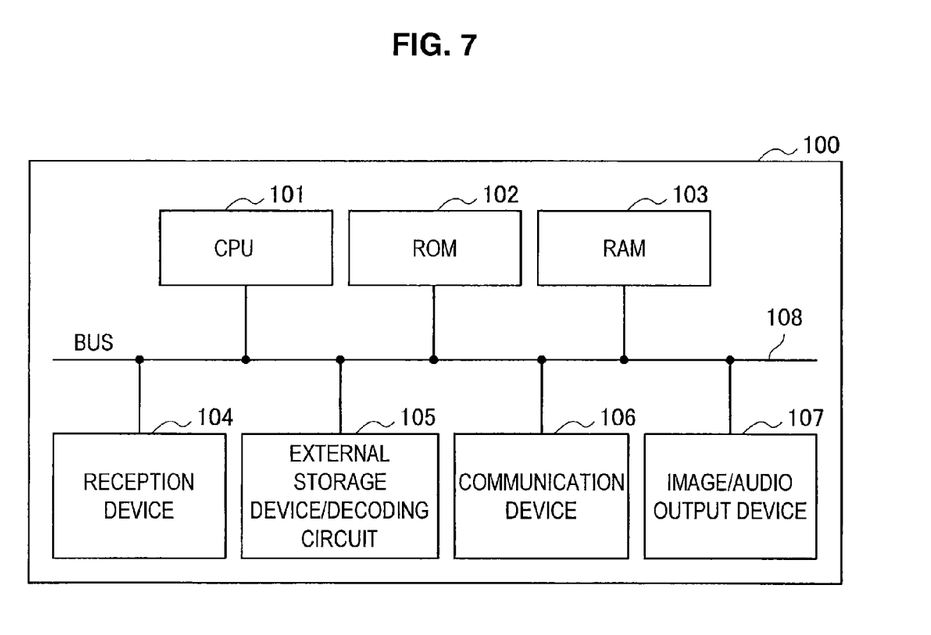
FIG. 7 is a hardware configuration diagram illustrating an example configuration of a television.

As shown in FIG. 7, for example, the television 100 of the present embodiment includes a Central Processing Unit (CPU) 101, a Read Only Memory (ROM) 102, and a Random Access Memory (RAM) 103. In addition, the television 100 includes a reception device 104, an external storage device/decoding circuit 105, a communication device 106, an image/audio output processing device 107, and a bus 108.

The CPU 101 functions as an operation processing device and a control device, and controls entire operations within the television 100 in response to various programs. In addition, the CPU 101 may be a microprocessor. The ROM 102 stores programs or operation parameters to be used by the CPU 101. The RAM 103 temporarily stores the programs that are used by the CPU 101 in the execution of the CPU or the parameters that are properly changed in the execution of the CPU. These components are interconnected to each other by the bus 108.

The reception device 104 is a device receiving RF signals that are the broadcast waves such as the digital terrestrial broadcasting at an external antenna of the television 100. The reception device 104 amplifies and demodulates the received RF signals. The demodulated signals are compressed by, for example, an MPEG method, and include signals of a plurality of programs. The external storage device/decoding circuit 105 decodes the signals demodulated by the reception device 104, and separates the signals into image data and audio data. In this case, the image data and the audio data are generated in each of the programs included in the demodulated signals.

The communication device 106 is a communication interface for communicating with the remote 200. The communication device 106 may be an infrared communication device, a communication device using a wireless LAN, or a communication device using a wireless USB. Alternatively, the communication device 106 may be a wired communication device carrying out communication by wire.

The image/audio output processing device 107 is a device outputting the image data and the audio data that are separately generated by the external storage device/decoding circuit 105. In addition, these image data and audio data are subjected to an image process and an audio process before they are output to the image/audio output processing device 107. The image/audio output processing device 107, for example, may use a liquid crystal display device or an organic EL display device as the image output device displaying the image data, and may use a speaker or the like as the audio output device displaying the audio data.

(2-2-2. Remote)

Figure 8:
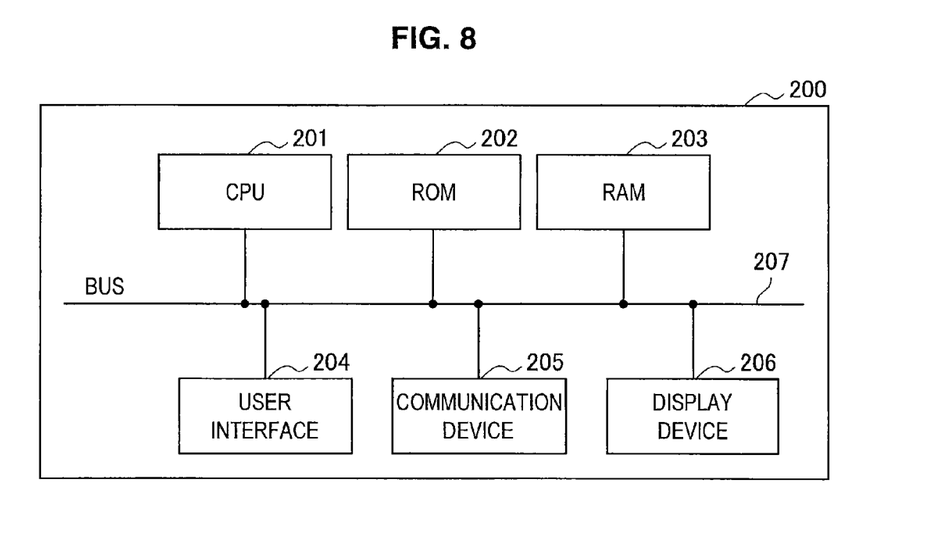
FIG. 8 is a hardware configuration diagram illustrating an example configuration of a remote controller.

As shown in FIG. 8, for example, the remote 200 of the present embodiment includes a CPU 201, a ROM 202, and a RAM 203. In addition, the remote 200 includes a user interface 204, a communication device 205, a display device 206, and a bus 207.

The CPU 201 functions as an operation processing device and a control device, and controls entire operations within the remote 200 in response to various programs. In addition, the CPU 201 may be a microprocessor. The ROM 202 stores programs or operation parameters to be used by the CPU 201. The RAM 203 temporarily stores the programs that are used by the CPU 201 in the execution of the CPU or the parameters that are properly changed in the execution of the CPU. These components are interconnected to each other by the bus 207.

The user interface 204 is an operation input unit by which operations for operating the television 100 are input. As described above, the user interface 204 may include physical buttons, sliders, and so forth, or may include software buttons, software sliders, and so forth using a liquid crystal attached with a touch panel. In addition, the process of displaying the software buttons or the like may be carried out by causing the CPU 201 to function as a display control unit. The communication unit 205 is a communication interface for communicating with the television 100. The communication device 205 corresponding to the communication device 106 of the television 100 may be disposed, and for example, an infrared communication device, a communication device using the wireless LAN, a communication device using the wireless USB, or a wired communication device carrying out communication by wire may be used as the communication device 205.

The display device 206 is a device displaying information, and a liquid crystal display device or an organic EL display device may be used as the display device 206. When the user interface 204 includes the software buttons or the like, the software buttons may be displayed on the display device 206.

[2-3. Configuration Example of Television and Remote]

Figure 9:
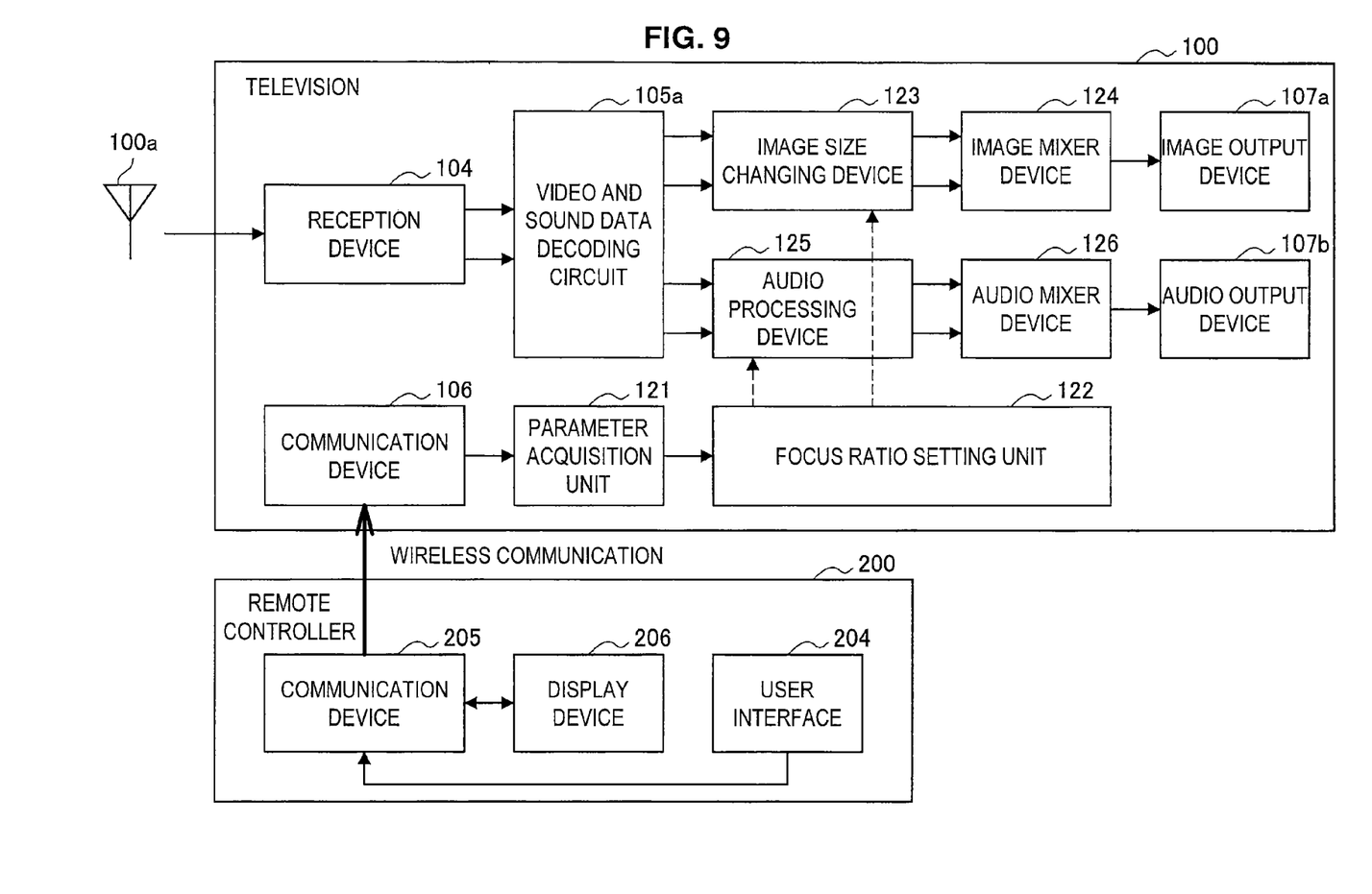
FIG. 9 is a block diagram illustrating an example configuration of a remote controller and a television in accordance with the embodiment of the present disclosure.

FIG. 9 is a diagram illustrating an example configuration of the television 100 and the remote 200 in accordance with the present embodiment. In addition, structural elements that have substantially the same functions as the television 100 and the remote 200 shown in FIG. 7 are denoted with the same reference numerals in FIG. 9, and repeated explanation of these structural elements is omitted. In addition, some of the components shown in FIGS. 7 and 8 are omitted in FIG. 9.

The remote 200 will be described first. As shown in FIG. 9, the remote 200 includes the user interface 204, the communication device 205, and the display device 206. These components function in the same way as the user interface 204, the communication device 205, and the display device 206 shown in FIG. 8. In addition, the remote 200 shown in FIG. 9 includes the CPU 201, the ROM 202, and the RAM 203 shown in FIG. 8.

The user interface 204 of the remote 200 includes the display mode switching button, the focus value ratio change slider 230, and so forth. The information on the set focus value of the audio of each program input from the user interface 204 is transmitted to the communication device 106 of the television 100 via the communication device 205.

On the other hand, as shown in FIG. 9, the television 100 includes the reception device 104, a video sound data decoding circuit 105a, the communication device 106, an image output device 107a, and an audio output device 107b. In addition, the television 100 further includes a parameter acquisition unit 121, a focus ratio setting unit 122, an image size changing device 123, an image mixer device 124, an audio processing device 125, and an audio mixer device 126. The reception device 104 and the communication device 106 function in the same way as the reception device 104 and the communication device 106 shown in FIG. 7. In addition, the video sound data decoding circuit 105a corresponds to the external storage device/decoding circuit 105, and the image output device 107a and the audio output device 107b correspond to the image/audio output processing device 107.

The parameter acquisition unit 121 acquires parameters indicating operation input information transmitted from the remote 200 via the communication device 106. The parameter acquisition unit 121 acquires, for example, channel selection information indicating the channels of the programs displayed on the display unit 110, screen mode information for switching between the one-screen mode and the two-screen mode, volume information for changing the volume, focus information indicating the setting of the focus value of the audio, and so forth. Here, the focus information is output to the focus ratio setting unit 122.

The focus ratio setting unit 122 outputs the screen size change instruction to the image size changing device 123, and outputs the audio data modification instruction to the audio processing device 125 based on the focus information input from the parameter acquisition unit 121. The focus information includes the focus value of the audio of CH1. The focus ratio setting unit 122 calculates the focus value of the audio of CH2 based on the relation of (B2) described above on the basis of the focus value of the audio of the input CH1.

In addition, the focus ratio setting unit 122 determines the screen sizes of the display areas 112 and 114 of the image data based on the focus values of the respective CH1 and CH2. For example, when the ratio of the screen sizes is changed in a similar way to the focus ratio, the screen sizes of the display areas 112 and 114 are set such that the focus ratio of CH1 and CH2 is equal to the ratio of the screen sizes. The focus ratio setting unit 122 outputs the set screen sizes to the image size changing device 123, and outputs the focus values to the audio processing device 125.

The image size changing device 123 changes the screen sizes of the image data displayed in the display areas 112 and 114 based on the image size change instruction input from the focus ratio setting unit 122. In the television 100, when the reception device 104 receives the RF signals that are broadcast waves such as the digital terrestrial broadcasting from an external antenna 100a, the signals that are amplified and demodulated by the reception device 104 are decoded by the video sound data decoding circuit 105a. As described above, the demodulated signals include signals of a plurality of programs, and are separated into image data and audio data for each program.

When the image size changing device 123 receives the image data from the video sound data decoding circuit 105a, the image size changing device changes the screen size of each image data corresponding to each display area to be in conformity with the screen size of the display area set in the focus ratio setting unit 122. The image data of which the screen size is changed is output to the image output device 107a via the image mixer device 124.

When the audio processing device 125 receives the audio data from the video sound data decoding circuit 105a, the audio processing device carries out the focus process of composing the audio data of each program to be in conformity with the focus value set in the focus ratio setting unit 122. The audio data subjected to the focus process is output to the audio output device 107b via the audio mixer device 126.

The configuration and the function of the television 100 and the remote 200 to which the audio output system of the present embodiment is applied have been described. According to the present disclosure, the focus value ratio setting unit 122 changes the focus values of the audios of the programs displayed in a plurality of display areas based on the focus information set by the focus ratio change slider 230. The audio processing device 125 composes the audio data of each program to be in conformity with the focus value set in the focus ratio setting unit 122. It is thus possible for the viewer to more clearly listen to the audio of the program of interest and also to recognize the audio of another program. In addition, the size of the display area may be changed in response to the focus ratio of the audio.

<3. Example of Applying Audio Output System>

The audio output system of the present embodiment changes the focus value of the audio based on trigger information associated with the audio to be output. For example, in the example described above, the slide unit 232 of the focus ratio change slider 230 is operated by the user, and the focus value of the audio is changed by the focus value ratio setting unit 122. In this case, the trigger information is an operation input from the focus ratio change slider 230 (focus information corresponding to the position of the slide unit 232). In addition, the audio output system may automatically change the focus value by virtue of the focus value ratio setting unit 122 based on the contents of the content to be reproduced or the user's environment. In this case, the trigger information is the contents of the content to be reproduced or the user's environment. Hereinafter, a process of applying the audio output system of the present embodiment and changing the focus value of the audio based on the trigger information will be described.

APPLICATION EXAMPLE 1

For example, when the viewer A wants to watch a news program while the family is playing a game, the family or the viewer A may use the remote 200 to switch the display of the television 100 to the two-screen mode, and the game and the news program may thus be displayed on the display unit 110. In this case, since it is sufficient if the contents obtained from the audio of the news program can be understood, the display area of the game is set to be larger than the display area of the news program by the user (e.g., the display area of the game is set to 70% and the display area of the news program is set to 30%). In the television 100, an instruction to change the size of the display area is received from the remote 200, the size of the designated display area is set by the focus ratio setting unit 122, and each display is changed to the size designated by the image size changing device 123.

In this case, the focus ratio setting unit 122 changes the focus value of the audio in response to the change in size of the display area. The display area of the news program may be small. However, in order for the audio to be clearly heard, the focus value of the news program may be greater than the focus value of the audio of the game. Alternatively, the focus value of the audio may also be set to be small when the display area is small. The ratio of the focus values set by the focus ratio setting unit 122 is output to the audio processing device 125, and the focus values of the audios of the respective programs are changed by the audio processing device 125. In this way, it is possible to watch the content in an environment in conformity with the viewer's request by using contents of the content to be displayed or the viewer's request as the trigger information and setting the focus value of the audio and the size of the display area.

APPLICATION EXAMPLE 2

In addition, for example, a weather forecast that is checked daily is to be broadcast at the time of 19:25 while a drama being broadcast from the time of 19:00 is watched. The television 100 of the present embodiment holds information on the weather forecast (e.g., program titles or IDs specifying the programs), and automatically displays a pop-up screen on the display unit 110 to show the viewer the screen when the broadcasting of the weather forecast is initiated. That is, the information on the weather forecast is used as the trigger information, and a program is displayed on the display unit 110 when the program matching the trigger information is broadcast. In this case, the audio of the drama and the audio of the weather forecast are multiplexed.

In this case, in order not to disturb watching the drama, the focus ratio setting unit 122, for example, causes a small pop-up screen to be displayed on a corner of the display unit 110 and also sets the focus value of the audio of the weather forecast not to disturb the audio of the drama. It is thus possible to notify the user of the contents of the weather forecast without disturbing watching the drama. The pop-up screen disappears when the weather forecast is finished, and the display is returned to a screen on which only the drama is displayed. In this case, the focus ratio setting unit 122 sets the focus value of the audio of the weather forecast to zero to silence the sound. The broadcasting schedule of the weather forecast may be acquired, for example, by referring to the electronic program guide, and may be displayed on the pop-up screen when the corresponding weather forecast is broadcast even when the broadcasting time is changed.

APPLICATION EXAMPLE 3

In addition, when two programs are displayed in the two-screen mode in the television 100, the focus ratio setting unit 122 typically sets the focus value of the audio of the program being watched as a main primary program (primary) to be greater than the focus value of the audio of the program being watched as a secondary program (secondary). This enables the user to recognize information on the primary program. Here, when a commercial message (CM) of the primary program is detected, the focus ratio setting unit 122 sets the focus value of the audio of the secondary program to be greater than the focus value of the CM audio of the primary program. The focus ratio setting unit 122 then sets the focus value of the CM audio of the primary program to be greater and sets the focus value of the audio of the secondary program to be smaller when the CM of the primary program is finished. The audio of the secondary program is thus decreased not to disturb the audio of the primary program or is silenced.

In addition, the primary program and the secondary program may not be displayed in the two-screen mode. For example, only the primary program may be typically displayed, and a pop-up display screen indicating that the CM of the primary program is being broadcast may be automatically displayed when the CM of the primary program is detected. In this case, the focus ratio setting unit 122 also typically sets the focus value of the audio of the primary program to be greater than the focus value of the audio of the second program. However, when the CM of the primary program is detected, the focus ratio setting unit sets the focus value of the audio of the secondary program to be greater than the focus value of the CM audio of the primary program. When the CM of the primary program is finished, the pop-up screen displaying the secondary program is made not to be displayed, and only the primary program is displayed. In this case, the audio of the secondary program is decreased not to disturb the audio of the primary program or is silenced when the CM of the primary program is finished.

In this way, setting the usual focus values is changed using the CM initiation of the primary program as the trigger information. It is thus possible for the user to recognize the primary audio of the information meaningful to the user by changing the degree of highlighting of the audios of the two programs.

APPLICATION EXAMPLE 4

In addition, keywords may be registered in advance on the television 100 and a notice screen may be displayed automatically by pop-up based on the keywords. That is, the keywords are the trigger information. The keywords, for example, may include a program genre such as the weather forecast, a person's name, or a group's name. When the program matching the keyword other than the primary program is broadcast while the primary program is displayed in the one-screen mode, the television 100 automatically switches to the two-screen mode, and displays the program matching the keyword as the secondary program. Searching the program matching the keyword may be carried out using the electronic program guide.

Here, degrees of importance may be given to the keywords. It is thus possible for the focus ratio setting unit 122 to set the focus value of the audio of the secondary program in response to the degree of importance of the keyword. For example, when a program matching the keyword having a high degree of importance is detected, the focus ratio setting unit 122 may set the focus value of the program to be greater (e.g., equal to or greater than the focus value of the audio of the primary program), thereby strongly notifying the viewer of the broadcasting of the corresponding program. On the other hand, when a program matching the keyword having a low degree of importance is detected, the focus ratio setting unit 122 may set the focus value of the program to be smaller (e.g., smaller than the focus value of the audio of the primary program).

In addition, in the case of other keywords, only the program having the highest degree of importance may be displayed by pop-up when a plurality of programs matching the keywords are detected. Alternatively, the sizes of the pop-up screens and the focus values may be changed to display all detected programs by pop-up in response to the degrees of importance of the keywords.

APPLICATION EXAMPLE 5

In addition, the focus value of the audio of the program may be changed in response to the posture state of the viewer watching the television 100. For example, a sight line recognition sensor capable of recognizing the sight line of the viewer may be disposed in the television 100. For example, a CCD sensor or a CMOS sensor that is already known is used as the sight line recognition sensor. In addition, at the time of detecting the posture state other than the sight line, a motion sensor using an infrared sensor, which has already been put to practical use, may be used. In this case, the focus ratio setting unit 122 uses the detection result of the sight line recognition sensor as the trigger information to increase the focus value of the program when it is determined that the viewer is watching the television 100 and to decrease the focus value of the program when it is determined that the viewer is not watching the television 100. In addition, when a plurality of programs are displayed, programs being watched by the viewer may be specified from the direction of the sight line of the viewer, and the focus value of the audio of the specified program being watched by the viewer may be made to be greater than the focus values of the audios of other programs.

When it is determined that the viewer is not watching the television 100 from the detection result of the sight line recognition sensor, the focus value of the audio of the program may be gradually decreased. In this case, the focus ratio setting unit 122 may darken the screen while decreasing the focus value. It is thus possible to reduce the consumed power of the television 100 and to start the television 100 in an energy saving mode.

APPLICATION EXAMPLE 6

In addition, the focus ratio setting unit 122 may change the focus value of the audio of the program in response to the degree of urgency such as incidents and accidents occurring in an environment around the television 100. The environment around the television 100 may be specified based on the position information of the television 100, and may be treated in the same way as the environment in which the user is watching the television 100. The focus ratio setting unit 122 then determines the relevance between the environment of the user (position information of the television 100) and information to be notified of by the television 100, and changes the focus value in response to the degree of relevance. For example, when an emergency earthquake alert indicating the occurrence of an earthquake is notified of, the focus ratio setting unit determines the degree of urgency in response to the closeness between the position information of the television 100 and the earthquake occurrence position. The alert becomes information having a higher degree of notification urgency when the current position of the television 100 is closer to the earthquake occurrence position.

When it is determined that the alert is the information having a high degree of notification urgency, the audio of the program being watched and the audio of the emergency earthquake alert are mixed and output from the audio output device. It is thus possible to reliably notify the viewer of the notification sound of the emergency earthquake alert without disturbing the sound of the program. In this case, the focus value of the notification sound of the emergency earthquake alert may be increased and the focus value of the audio of the program may be decreased. In this way, the focus ratio setting unit 122 may use the information having a high degree of notification urgency as the trigger information by virtue of the relevance with the television 100 (i.e., user) to mix and output a plurality of audios.

APPLICATION EXAMPLE 7

In addition to the television 100, for example, the audio output system of the present embodiment may also be applied to a mobile communication terminal such as a mobile phone. For example, in the case of a mobile phone, the voice of the speaker and the nearby sound (environmental sound) are collected by different microphones, and are mixed by the frequency division multiplexing process. It is thus possible to cause the listener to readily listen to any of the voice of the speaker and the environmental sound and to enhance the realistic sensation of the listener. In this case, in order to make the voice of the speaker clearly heard, the focus ratio setting unit 122 may increase the focus value of the voice of the speaker and decrease the focus value of the environmental sound. In this way, it is possible to set the focus values of the respective audios using the contents (kinds) of the audio as the trigger information.

APPLICATION EXAMPLE 8

In addition, when an Internet telephone service or an online game service is received in the television 100, chatting on the television phone or playing the online game is possible while watching the television program. For example, the intended party of the television phone is displayed in the primary display area, and the television program is displayed in the secondary display area. In this case, in order to make the voice of the television telephone clearly heard, the focus ratio setting unit 122 may increase the focus value of the voice of the television phone and decrease the focus value of the audio of the television program. In this way, the contents of the audio may be used as the trigger information to set the focus values of the respective audios.

APPLICATION EXAMPLE 9

In addition, the audio output system of the present embodiment may be applied to a portable music player equipped with a radio tuner. For example, when traffic jam information or a weather forecast is initiated while the music recorded beforehand on the music player is listened to, both the music and the audio of the radio are output. In this case, these audios may be subjected to the frequency division multiplexing process to make any of the audios heard. In addition, in order for the audio information output from the radio to be clearly heard, the focus ratio setting unit 122 may increase the focus value of the audio of the radio and decrease the focus value of the music. In this way, it is possible to set the focus values of the respective audios using the contents (kinds) of the audio as the trigger information.

APPLICATION EXAMPLE 10

In addition, the audio output system of the present embodiment may be applied to a case of outputting primary audio and secondary audio of the television 100 at the same time. It is thus possible to readily listen to both the primary audio and secondary audio at the same time. In addition, when two different languages such as Japanese and English are output as the primary audio and the secondary audio, both languages may be listened to at the same time, which is useful in learning foreign languages. In this case, the focus ratio setting unit 122, for example, may increase the focus value of the primary audio and decrease the focus value of the secondary audio. In this way, it is possible to set the focus values of the respective audios using the contents (kinds) of the audio as the trigger information.

APPLICATION EXAMPLE 11

In addition, when a plurality of programs are watched on the television 100, the focus values of the respective programs may be automatically changed in response to the contents of the programs being watched. For example, in the case of the news program, it is important to listen to the voice of the announcer. On the other hand, in the case of sports such as a baseball or soccer, a matching video or realistic sensation is important. Here, for example, when the sports program and the news program are watched at the same time, the focus ratio setting unit 122 increases the focus value of the audio of the news program. In this way, it is possible to set the focus values of the respective audios using the contents (kinds) of the audio as the trigger information.

In addition, since the sound of the human has a frequency band of 1 to 5 kHz, the audio processing device 125 preferentially allocates such a frequency band to the audio of the news program in the frequency division multiplexing process. It is thus possible to more readily listen to the voice of the announcer. On the other hand, since the low frequency band is important in the case of the sports program, the audio processing device 125, for example, preferentially locates the frequency band of 20 to 500 Hz to the audio of the sports program. In addition, the high frequency band of the audio may be preferentially allocated in the case of a music program or the like. In addition, in the case of programs of the same genre, the frequency band may be uniformly allocated. In this way, it is possible to use the focus value in response to the frequency band and to more clearly present the audio suitable for the content.

APPLICATION EXAMPLE 12

Traffic information and music or television programs may also be presented to the car navigation system at the same time. Here, while listening to the music from the car navigation system, an interruption such as traffic jam information or road construction information may be carried out using the audio output system of the present embodiment, and an audio mixed with the interruption information may be output without stopping the music reproduction. In this case, since the interruption information is considered as information having a high degree of importance, the focus ratio setting unit 122 may decrease the focus value of the music and increase the focus value of the composed audio of the interruption information, thereby allowing the interruption information to be readily listened to. In this way, it is possible to set the focus values of the respective audios using the contents (kinds) of the audio as the trigger information.

The application examples described above may be independently carried out, or may be carried out using two or more combined pieces of trigger information.

It should be understood by those skilled in the art that various modifications, combinations, sub-combinations and alterations may occur depending on design requirements and other factors insofar as they are within the scope of the appended claims or the equivalents thereof.

For example, in the embodiments described above, although the case in which the audio output system is mainly applied to the television 100 and the remote 200 has been described, the present disclosure is not limited thereto. For example, the present disclosure may be applied to the tablet type device 300 shown in FIG. 10. In the tablet type device 300, for example, it is possible to display the display areas 312 and 314 displaying the television programs, and the television program video list 320 for selecting the television program on the display unit 310 of the device 300. A touch sensor is disposed on the display unit 310, and an operation object such as a finger or a touch pen may be moved in contact with the display surface of the display unit 310, thereby operating the display contents.

Figure 10:
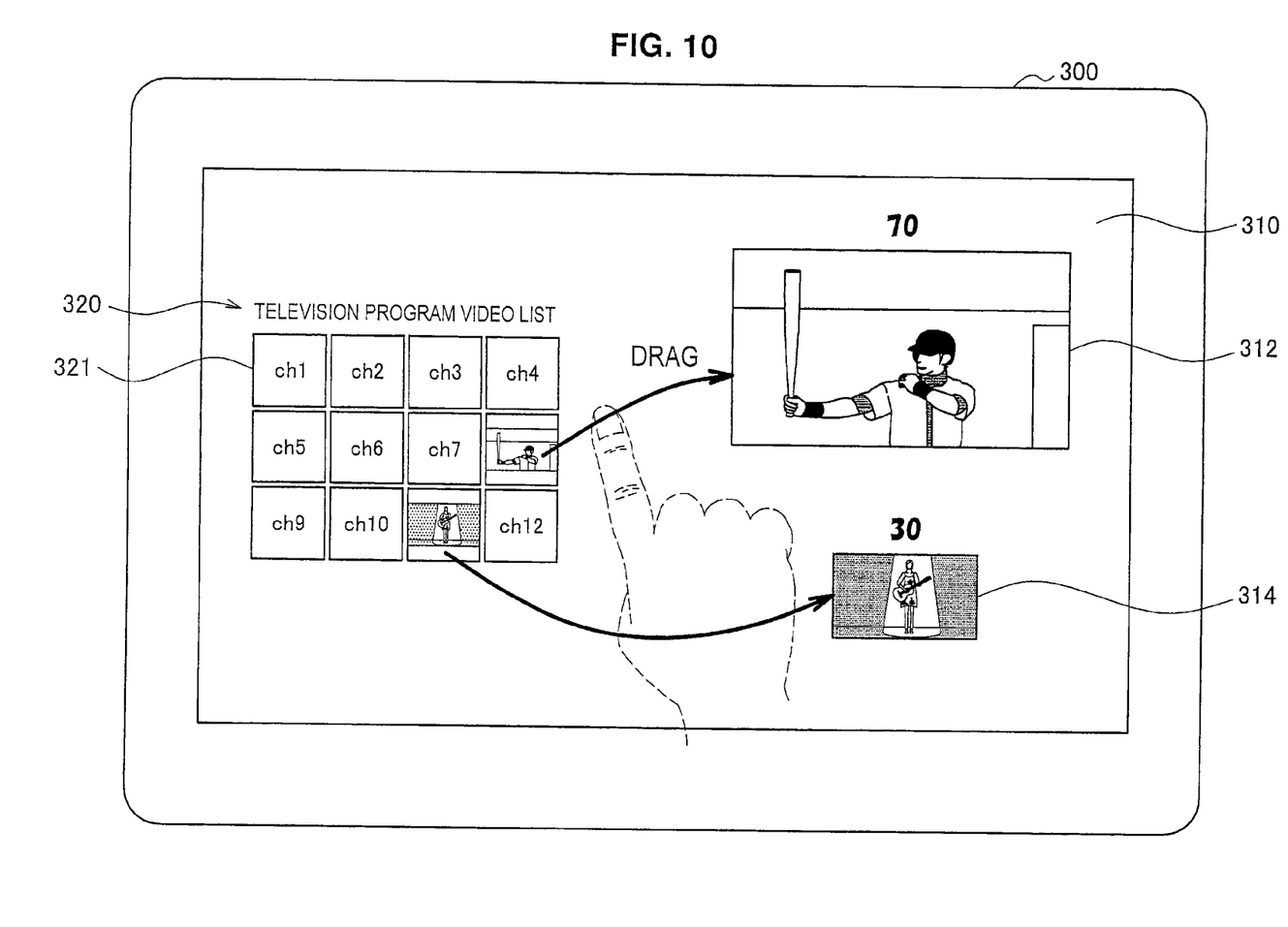
FIG. 10 is a diagram illustrating an operation interface of a tablet type device.

The user may select the icon 321 of the television program to be watched from the television program video list 320 and may drag the icon to any display area to display the selected television program in the display area. The focus values of the audios of the television programs displayed in the two display areas 312 and 314 may be displayed in the respective display areas 312 and 314 in a similar way to FIG. 1.

In the tablet type device 300, for example, when a pinch-out operation in which two adjacent fingers are separated is carried out in any of the display areas, it is possible to increase the focus value of the audio of the television program displayed in the corresponding display area. In this case, the focus value of the audio of the television program displayed in the other display area may be automatically decreased to the extent that the focus value of the television program on the one display area is increased. In addition, for example, when a pinch-in operation in which two separated fingers are brought closer to each other is carried out in any of the display areas, it is possible to decrease the focus value of the audio of the television program displayed in the corresponding display area. In this case, the focus value of the audio of the television program displayed in the other display area may be automatically increased to the extent that the focus value of the television program in the one display area is decreased.

In this way, it is possible to set and change the focus value of the audio, for example, by virtue of gesture input or the like, without using the focus ratio changing unit shown in FIG. 2.

In addition, although the audio adjustment unit adjusting the focus value such as the focus ratio change slider 230 is disposed in the remote 200 in the present embodiment, the present disclosure is not limited thereto. For example, when the audio adjustment unit is disposed as a software input unit, a program causing the audio adjustment unit capable of adjusting the focus value of each audio data to be displayed on the display unit may be disposed via a network. In this case, the program is executed in equipment that has received the provision of the program to cause the audio adjustment unit to be displayed on the display unit. Alternatively, the program may be executed on a server connected via the network, and the equipment that has received the executed result may cause the audio adjustment unit to be displayed on the display unit based on the executed result.

Additionally, the following configurations are also within the technical scope of the present disclosure.

(1)
An information processing device including:
an audio adjustment unit configured to adjust focus values each indicating a degree of highlighting of audio data of each content displayed in a plurality of display areas.

(2)
The information processing device according to (1), wherein the audio adjustment unit is a slider that adjusts a ratio of the focus value of the audio data.

(3)
The information processing device according to (1), wherein the audio adjustment unit is a knob adjustment unit that adjusts a ratio of the focus value of the audio data.

(4)
The information processing device according to (1), wherein the audio adjustment unit is a number input unit that inputs a ratio of the focus value of the audio data.

(5)
The information processing device according to any of (1) to (4), wherein the focus values of the plurality of audio data are adjustable by the audio adjustment unit.

(6)
The information processing device according to any of (1) to (5), wherein the audio adjustment unit adjusts a size of each corresponding display area in conjunction with the focus value of the audio data.

(7)
The information processing device according to any of (1) to (6), wherein a focus ratio of the audio data is displayed on a display unit.

Additionally, the following configurations are also within the technical scope of the present disclosure.

(1)
An information processing device including:
a focus ratio setting unit configured to set a ratio of a focus value indicating a degree of highlighting of each piece of audio data based on trigger information associated with a plurality of pieces of audio data that are output at a same time; and an audio processing unit configured to compose each piece of the audio data with the set focus value.

(2) The information processing device according to (1), wherein the focus ratio setting unit sets the ratio of the focus value of each piece of the audio data that are output based on change information on the ratio of the focus value set by a user as the trigger information.

(3) The information processing device according to (1) or (2), wherein the focus ratio setting unit sets the ratio of the focus value of each piece of the audio data that are output based on information on contents of the audio data as the trigger information.

(4) The information processing device according to any of (1) to (3), wherein the focus ratio setting unit sets the ratio of the focus value of each piece of the audio data that are output based on relevance between an environment in which the audio data are output and the audio data that are output as the trigger information.

(5) The information processing device according to any of (1) to (4), wherein the focus ratio setting unit sets the ratio of the focus value of each piece of the audio data that are output based on a posture state of a user to be provided with the audio data as the trigger information.

(6) The information processing device according to any of (1) to (5), wherein the audio processing unit allocates the audio data to a plurality of divided bands generated by dividing a frequency band, according to contents of respective pieces of the audio data, and composes the respective pieces of the audio data allocated to the respective divided bands.

(7) The information processing device according to any of (1) to (6), wherein when image data corresponding to each piece of the audio data is displayed on a display unit, the focus ratio setting unit sets the focus value of the audio data based on a size of a display area on which the image data is displayed.

The present disclosure contains subject matter related to that disclosed in Japanese Priority Patent Applications JP 2011-199227 and JP 2011-199228, both filed in the Japan Patent Office on Sep. 13, 2011, the entire content of which is hereby incorporated by reference.

What is claimed is:

1. An information processing device comprising:
   circuitry configured to
      cause simultaneous display of a plurality of visual contents to multiple users via a display device, each of the plurality of contents having audio associated therewith, each of the plurality of visual contents being displayed in a separate display area on the display device,
      adjust, based on input from at least one of the multiple users via a single slider, focus values each indicating a degree of emphasis of audio associated with at least one of the plurality of visual contents over audio associated with others of the plurality of visual contents, and
      reproduce the audio associated with the plurality of visual contents based the focus values after adjustment.

2. The information processing device according to claim 1, wherein the focus values of the audio associated with the plurality of visual contents are adjustable.

3. The information processing device according to claim 1, wherein the circuitry adjusts a size of each corresponding display area in conjunction with the focus value of the audio associated with the plurality of visual contents.

4. The information processing device according to claim 1, wherein a focus ratio of the audio is displayed on the display device.

5. A non-transitory computer-readable medium encoded with computer-readable instructions that, when executed by a computer, cause the computer to perform a method comprising:
   causing simultaneous display of a plurality of visual contents to multiple users via a display device, each of the plurality of contents having audio associated therewith, each of the plurality of visual contents being displayed in a separate display area on the display device;
   adjusting, based on input from at least one of the multiple uses via a single slider, focus values each indicating a degree of emphasis of audio associated with at least one of the plurality of visual contents over audio associated with others of the plurality of visual contents; and
   reproducing the audio associated with the plurality of visual contents based on the focus values after adjustment.

6. A method to cause an information processing device to generate audio, comprising:
   causing, with circuitry of the information processing device, simultaneous display of a plurality of visual contents to multiple users via a display device, each of the plurality of contents having audio associated therewith, each of the plurality of visual contents being displayed in a separate display area on the display device;
   adjusting, in the circuitry of the information processing device and based on input from at least one of the multiple uses via a single slider, focus values indicating a degree of emphasis of audio associated with at least one of the plurality of visual contents over audio associated with others of the plurality of visual contents; and
   causing the circuitry of the information processing device to reproduce the audio associated with the plurality of visual data based on the focus values after adjustment.

7. The information processing device according to claim 1, wherein the circuitry further adjusts the focus values based on at least a portion of each of the plurality of visual contents.

8. The information processing device according to claim 1, wherein the plurality of visual contents include a first visual content and a second visual content, and the single slider includes a first extreme position to cause reproduction of only audio from the first visual content and a second extreme position to cause reproduction of only audio from the second visual content.

* * * * *